United States Patent
Lee-Chan et al.

(10) Patent No.: US 9,830,668 B1
(45) Date of Patent: *Nov. 28, 2017

(54) IDENTIFYING TOP FANS

(71) Applicant: Google Inc., Mountain View, CA (US)

(72) Inventors: Jeffrey Lee-Chan, Venice, CA (US); Michael Patrick Schneider, Venice, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,516

(22) Filed: Jun. 29, 2016

Related U.S. Application Data

(63) Continuation of application No. 14/084,239, filed on Nov. 19, 2013, now Pat. No. 9,384,258.

(60) Provisional application No. 61/860,768, filed on Jul. 31, 2013.

(51) Int. Cl.
*G06F 17/30* (2006.01)
*G06Q 50/00* (2012.01)
*G06Q 30/02* (2012.01)
*G06F 3/0481* (2013.01)
*G06F 3/0484* (2013.01)

(52) U.S. Cl.
CPC ........... *G06Q 50/01* (2013.01); *G06F 3/0481* (2013.01); *G06F 3/0484* (2013.01); *G06F 17/3053* (2013.01); *G06F 17/30867* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 8,312,056 B1 | 11/2012 | Peng et al. | |
| 8,510,380 B2 | 8/2013 | Faller et al. | |
| 8,572,094 B2 | 10/2013 | Luo et al. | |
| 9,384,258 B1 * | 7/2016 | Lee-chan | G06F 17/3089 |
| 2012/0150631 A1 | 6/2012 | Root et al. | |
| 2012/0253918 A1 * | 10/2012 | Marois | G06Q 30/02 705/14.39 |
| 2013/0124257 A1 * | 5/2013 | Schubert | G06Q 30/02 705/7.29 |
| 2013/0226865 A1 * | 8/2013 | Munemann | G06F 17/30864 707/609 |
| 2013/0297543 A1 | 11/2013 | Treiser | |

(Continued)

OTHER PUBLICATIONS

Notice of Allowance dated Mar. 2, 2016 in U.S. Appl. No. 14/084,239.
Office Action dated Sep. 14, 2015 in U.S. Appl. No. 14/084,239.

*Primary Examiner* — Anh Tai Tran
(74) *Attorney, Agent, or Firm* — Byrne Poh LLP

(57) ABSTRACT

Both content creators and content consumers can benefit by improving communication mechanisms that currently exist. For example, content creators can increase the appeal of content by leveraging the energy of fans, but it is often difficult to identify which content consumers are the best or top fans. However, such can be identified based on various metrics, for example, based on engagement and/or influence of the content consumer. Once the set of top fans is identified, content creators can interact, potentially exclusively, with the set of top fans, which can enhance the experience for all parties involved.

19 Claims, 11 Drawing Sheets

(56) References Cited

U.S. PATENT DOCUMENTS

2013/0297619 A1 11/2013 Chandrasekaran et al.
2013/0311572 A1 11/2013 Faller et al.

* cited by examiner

IDENTIFYING TOP FANS

CROSS-REFERENCE TO RELATED APPLICATIONS

This application is a continuation of U.S. patent application Ser. No. 14/084,239, filed Nov. 19, 2013, which claims the benefit of U.S. Provisional Application No. 61/860,768, filed Jul. 31, 2013, which are hereby incorporated by reference herein in their entireties.

TECHNICAL FIELD

This disclosure generally relates to ranking fans of media content and/or content creators potentially based on publicly available data.

BACKGROUND

Video or other content hosting sites or services enable content creators to upload content that can be accessed by content consumers. As with other types of media or other forms of expression, content creators can attract a following.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to identifying a set of top fans of content created and/or managed by a particular content creator. An examination component can be configured to examine transactions facilitated by a set of content consumers in connection with content managed by a content creator. A scoring component can be configured to determine a score for a content consumer from the set of content consumers based on the transactions. The score can be specific to the content creator and can reflect an affinity, fondness, or favor the content consumer has for content managed by the content creator. A fan component can be configured to determine a set of top fans for the content creator, wherein the set of top fans can be a subset of content consumers and can be based upon the score.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
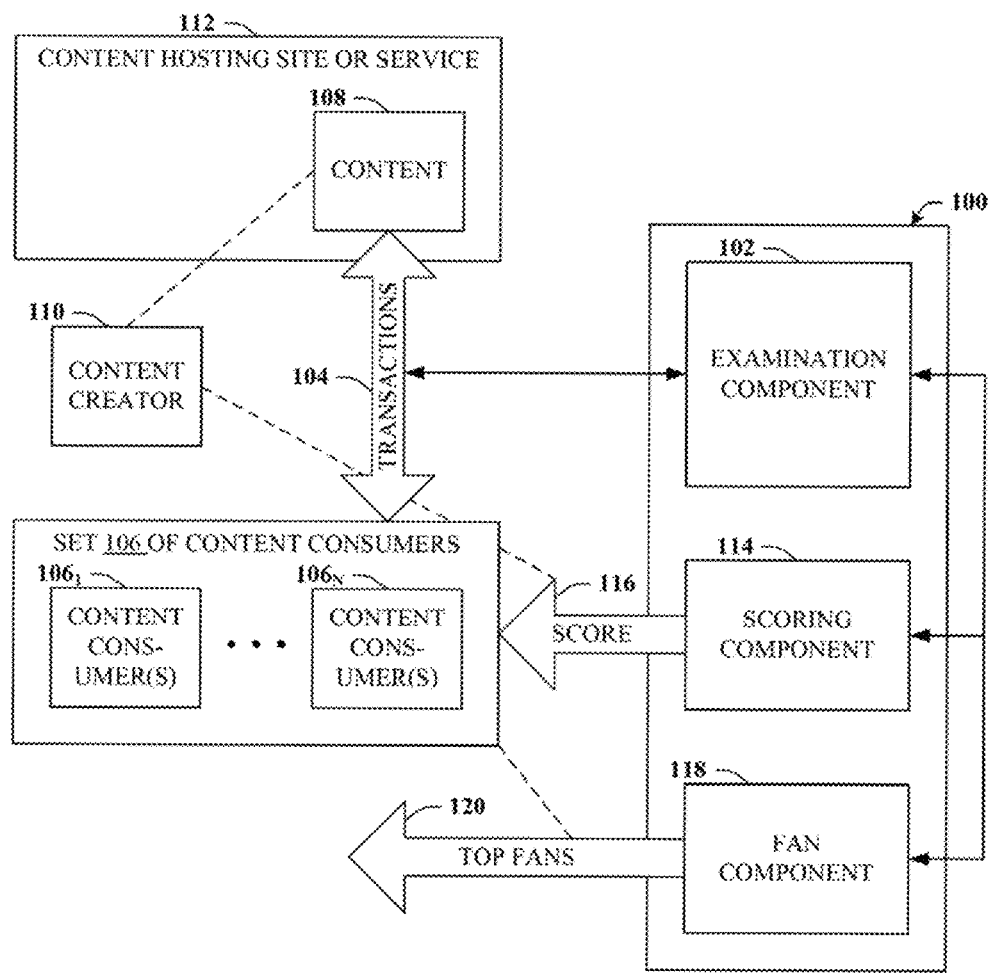
FIG. 1 illustrates a block diagram of an example system that can identify top fans from among a larger set of content consumers in accordance with certain embodiments of this disclosure.

As used herein, the term "content creator" is intended to refer to an entity associated with the creator, owner, curator, distributor, or manager of content. The term "content consumer" is intended to refer to an entity that presents or consumes that content. These entities are generally thought of as individuals, but as used herein, such can be devices, accounts, or other data associated with those individuals invoked or referred to by proxy. The term "fan" is used herein synonymously with content consumer. In some embodiments, a fan can be a special type of content consumer such as one that is highly engaged or particularly fond of the content of a particular content creator.

As noted previously, video or other content hosting sites or services enable content creators to upload content that can be accessed by content consumers. As with other types of media or other forms of expression, content creators can attract a following. When a content consuming fan feels connected to the content creator, experiences can be improved for all parties involved, including the fan, the creator, and the hosting entity. Therefore, hosting sites or services can increase appeal with both content consumers and content creators by further encouraging relationships that can be created between the content consumer and the content creator.

For example, when content consumers experience such relationships with favored content creators, the content consumers tend to engage more frequently with content on a hosting site or service such as, e.g., sharing more favored videos with friends or followers. One way to form such relationships is to provide mechanisms by which the content creator can reach out to associated fans. For instance, content creators might reply to a comment left by a particular fan, in which case the fan might experience additional gratification. As other examples, the content creator might publish additional content (e.g., videos) in response to requests, or post content to community-based or social circle-based sites that are linked to the content hosting site.

While several mechanisms exist for content consumers to reach associated content consumers, one shortcoming of existing methods is the content creator is generally not able to determine who are the most engaged fans (e.g., relative to other fans, such as fans with an average level of engagement). Providing such a feature can enable the content creator to substantially optimize impact of fan-based communications or transactions since the most engaged fans typically will have more powerful responses to actions of the content creator and typically will appreciate more efforts of the content creator in reaching out to them in a more targeted and/or personal manner. The most engaged fans typically will be more likely to share favorite videos with their own followers, write more interesting or insightful comments or responses, or otherwise provide input that benefits the media content ecosystem.

Providing a feature to enable content creators to accurately and easily identify (and rank) a top set of fans can provide a number of advantages. Content creators can engage more directly with the top fans and content consumers might be encouraged to interact more to increase one's rank. In response, the content creator might obtain more "buzz" or promotion in connection with the content (or channel), which can increase view counts, subscribers, and shares. Such can lead to increased consumption and in some cases increased advertising impressions, which can result in additional revenue for the content creator as well as the hosting site or service.

In some embodiments, the set of top fans can be identified based on one or more scoring algorithms or mechanisms. For example, an engagement score can be determined that describes a level of engagement a content consumer has with the content creator or content of the creator. Such can be determined based on transactions of the content consumers with respect to the content of the creator. Such transactions can include, for example, leaving a comment, indicating the content is "liked" or a favorite, adding the content to a playlist, subscribing to a channel or other similar following of the content creator, a duration in which the channel has been subscribed, and so on. The various transactions can be weighted based on a variety of metrics. For example, a comment transaction can be assigned a different weight than a subscribe transaction based on policy or various other factors. As another example, a comment transaction with thirty likes or other indications of approval might garner more weight or value than a comment transaction with only one like or other indication of approval from other content consumers. In some embodiments, certain transactions can result in a negative score, such as indicating the content is disliked, unsubscribing to a channel, removing the content from a playlist, and so forth.

In some embodiments, a time decay function can be implemented such that the engagement score for a particular content consumer is slowly reduced over time unless overcome by new transactions. In some embodiments, a maximum score cap can be applied, generally by time. For example, the engagement score for a particular content consumer can be limited for a given time period (e.g., per week). Thus, depending on the policy, content consumer activity that is consistent and enduring can be more highly scored than activity that is intense, but possibly spurious (e.g., spam or fad). It is underscored that in some embodiments, transactions of the content consumer that are examined can be identified based on publicly available data, and such scoring might be based exclusively on publicly available data. By using public data to determine a content consumer's level of engagement certain privacy concerns can be avoided.

In addition, an influence score can be calculated that can describe level of influence associated with the content consumer. In general, content creators prefer that fans of their content be both engaged (e.g., reflected by the engagement score) and influential (e.g., reflected by the influence score). The former can indicate that the content consumer is active and involved, and the latter can indicate that the content consumer's activities in that regard have a broader impact. The influence score can be determined based on number of subscribers or followers associated with the content consumer or the reaction to input from the content consumer by other content consumers. In many cases, such data can be public and therefore not require unnecessary or contentious data mining practices.

A candidate score can be determined as a function of the engagement score and the influence score. This candidate score can be the score employed to determine fan ranking or combined with other data or scores to derive an aggregate score for a given fan. As one example, the candidate score can be the engagement score multiplied by a log of the influence score divided by a log of a defined base.

In some embodiments, transactions can be filtered prior to scoring. For example, comments that are abusive or negative can be filtered or might be assigned a negative scoring weight. Hence, content consumers that post many comments that are not supportive or in the spirit of a fan are unlikely to be ranked highly simply based on the fact that many comments were posted. Such can be identified based on a number or proportion of times the content consumer's input has been marked as spam, disliked or voted down, a number or proportion of times the content consumer's account or profile has been blocked or similarly flagged, a number or proportion of private message from the content consumer that have been flagged as spam or undesired, word analysis mechanisms, "troll" identifying mechanisms, or the like.

As another example of filtering or negatively weighting transactions prior to scoring, such can be applied to spam as well. For instance, content consumers that are determined to be more focused on promoting content not related to the content creator, typically by leveraging the content creator's success or platform to do so. Such behavior can also result in many transactions that might otherwise imply a high fan score, but in this case can be filtered. Such can be determined by identifying several copies of the same data, potentially including links, input to comments or elsewhere, by identifying high levels of engagement with numerous content creators since it is unlikely a particular content consumer can be a legitimate fan of a large number of content creators, or the like.

Once the set of top fans are identified, such can be provided to the content creator along with other interesting or relevant information. In some embodiments, such can be provided as a sortable table of the top N fans, where N can be substantially any positive integer. Typically, N will be less than about 1000, and in some cases N can be determined as a function of a number of subscribers of the content creator or a number of total content consumers.

As a result, content creators can be better able to find, understand, and engage with top fans. The presented table can be sorted based on engagement score, influence score, or other metrics. The table can also include a feature to quickly add a fan to or remove a fan from a social circle that relates to the content creator. In addition, real-time activity from the top fans can be presented or referenced, with prompts to respond as well as insights about the top fans as a group (e.g., what is trending or resonating with the group). Content creators can also leverage these features and data to collaborate with top fans, to share special messages or content exclusively with the top fans, or to ensure that top fans are responded to, even in cases where responses to all content consumers might be too overwhelming.

Example System that Identifies Top Fans

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

Referring now to FIG. 1, a system 100 is depicted. System 100 can, inter alia, identify top fans from among a larger set of content consumers. Embodiments disclosed herein can, for example, rank the content consumers (or top fans). Such can enable features for understanding and engaging with (potentially exclusively) a set of fans that are likely to be more receptive and appreciative and in a manner that can be more productive. System 100 can include a memory that stores computer executable components and a processor that executes computer executable components stored in the memory, examples of which can be found with reference to FIG. 10. It is to be appreciated that the computer 1002 can be used in connection with implementing one or more of the systems or components shown and described in connection with FIG. 1 and other figures disclosed herein. As depicted, system 100 can include an examination component 102, a scoring component 114, and a fan component 118.

Examination component 102 can be configured to examine transactions 104 facilitated by a set 106 of content consumers $106_1$-$106_N$ in connection with content 108 managed by content creator 110. Set 106 of content consumers $106_1$-$106_N$ can include substantially any number, N, of individual content consumers $106_1$-$106_N$, which are hereinafter referred to, either individually or collectively, as content consumer(s) 106, with appropriate subscripts generally employed only when instructive or convenient to highlight various distinctions or to better impart the disclosed concepts. In some embodiments, content 108 can be stored on a server device (not shown) associated with a content hosting site or service 112. The content 108 can be uploaded to the content hosting site or service 112 by content creator 110 and available for access by all or a portion of the set of content consumers 106.

Figure 2:
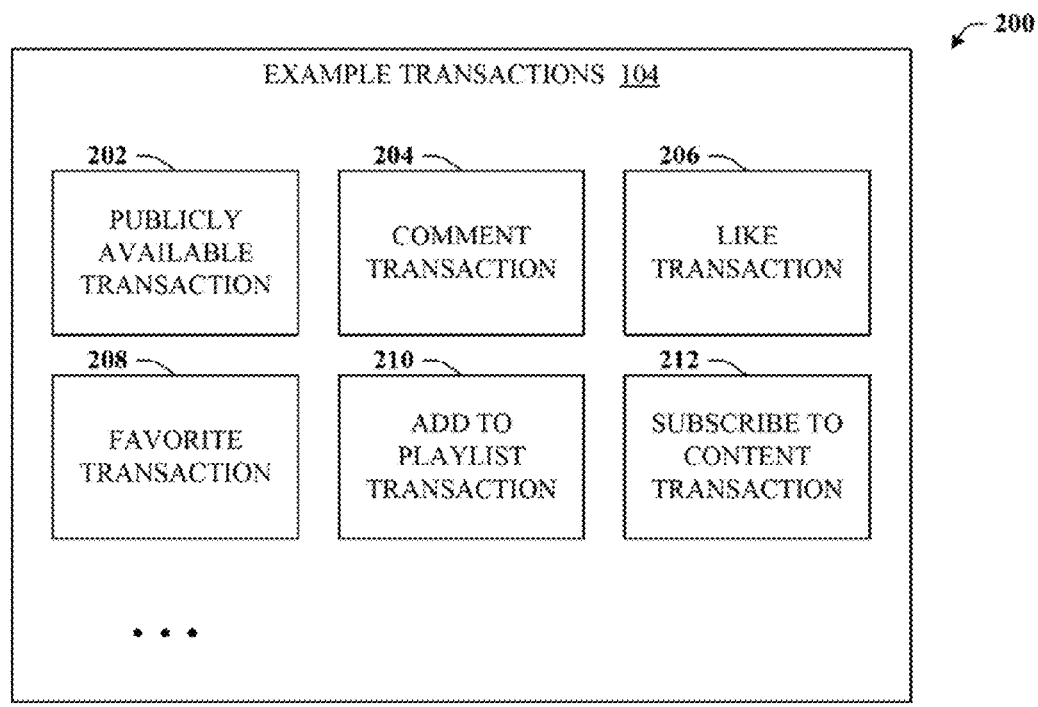
FIG. 2 illustrates a block diagram that depicts numerous examples of transactions and related data or information in accordance with certain embodiments of this disclosure.

Transactions 104 that are examined by examination component 102 can relate to substantially any input or exchange between a content consumer 106 (e.g., a device, account, etc.) and content hosting site or service 112, non-limiting examples of which are provided in connection with FIG. 2. In some embodiments, transactions 104 can be limited to only transactions that are advertised publicly and/or associated data is publicly viewable or available.

While still referring to FIG. 1, but referring also to FIG. 2, illustration 200 is provided. Illustration 200 depicts numerous examples of transactions 104 and related data or information. As noted, in some embodiments, transactions 104 can be those for which associated information or description is publicly available (e.g., publicly available transaction 202). Such example transactions 104 can be a comment transaction 204. Comment transaction 204 can relate to information, often text-based, that is posted in relation to content 108. For instance, content consumer 106 might post a comment that expresses, "Great video! I love your ideas and the way you express them," and such data can be included, e.g., in a comments section (that can be publicly accessible) associated with content 108.

Example transaction 104 can be a like transaction 206 in which content consumer 106 indicates a favorable experience in connection with content 110. Conversely, such can also include a dislike or unlike transaction, but generally such transactions will negatively impact the score or status of a content consumer 106 as a fan of content 108 provided or managed by content creator 110, which is further discussed infra. Additional example transactions 104 can be a favorite transaction 208 in which content consumer 106 selects content 108 for inclusion in a list of favored content (or, negatively, removal from the list); an add to playlist transaction 210 in which content consumer 106 includes content 108 in a playlist (or, negatively, removal from the playlist); or a subscribe to content transaction 212 in which content consumer 106 subscribes to a channel or other broadcast mechanism associated with content creator 110 (or, negatively, unsubscribes). The examples provided herein are intended to represent concrete examples, but are not intended to be exhaustive, as other examples of transactions 104 can exist.

Still referring to FIG. 1, system 100 can include scoring component 114. Scoring component 114 can be configured to determine score 116 for a particular content consumer 106 from the set 106 based on transaction 104, in some embodiments exclusively from transactions 104 for which associated data is public. Scoring component 114 can determine a respective score 116 for all or a portion of content consumer 106 based on the transactions 104 that are particular to a give content consumer 106. It is understood that while score 106 applies to a particular content consumer 106, score 116 can be specific to content creator 110. Score 116 can reflect fondness or affinity of the content consumer 106 for the content 108 managed by the content creator 110. Hence, a particular content consumer 106 can have many scores 116, one for each suitable content creator 110. Scoring component 114 can determine score 116 in a variety of ways, potentially determining many sub-scores that can be weighted in various ways, which is further detailed with reference to FIG. 3.

Figure 3:
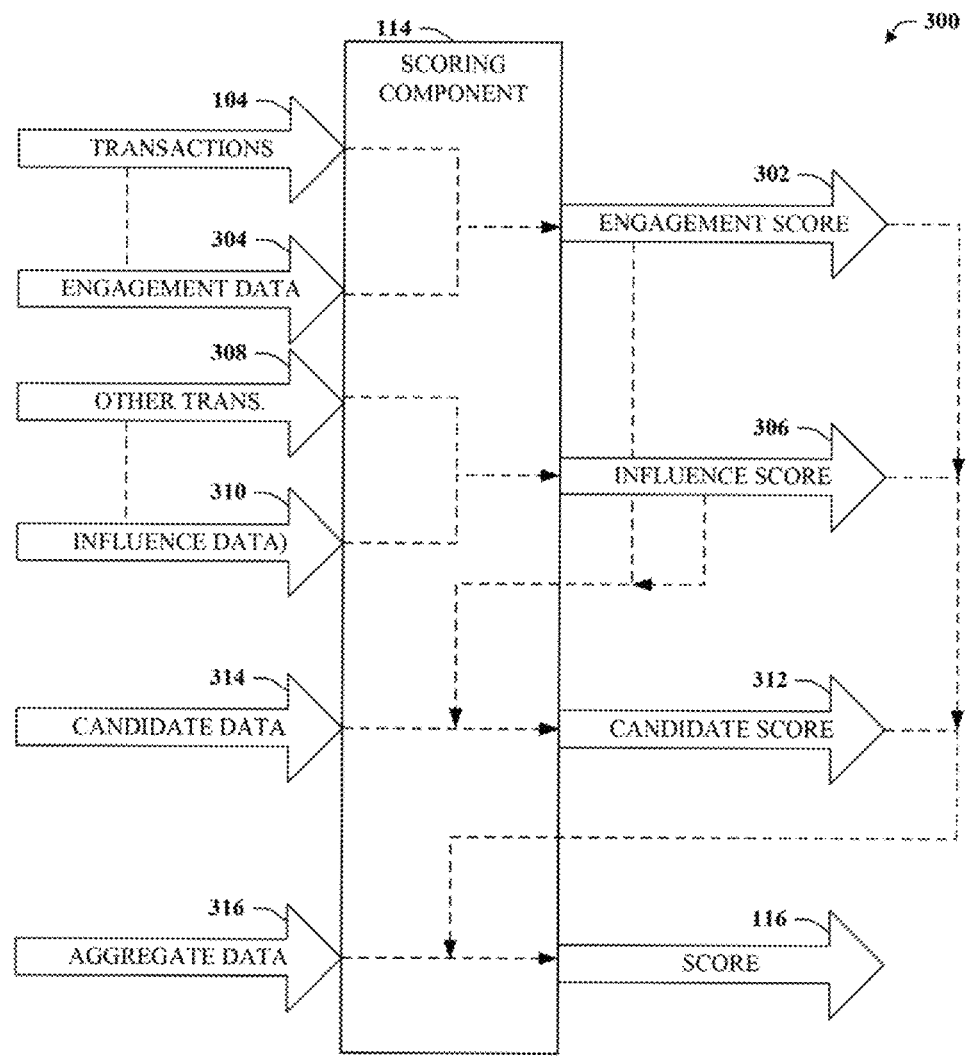
FIG. 3 illustrates a block diagram of additional aspects or features of the scoring component that can determine the score for a content consumer in accordance with certain embodiments of this disclosure.

Still referring to FIG. 1, but turning also to FIG. 3, system 300 is provided. System 300 depicts additional aspects or features of the scoring component 114 that can determine score 116 for content consumer 106. In some embodiments, scoring component 114 can determine a number of sub-scores such as engagement score 302, influence score 306, and/or candidate score 312. Score 116 can be determined as a function of one or more of the sub-scores.

Engagement score 302 can relate to a determined level of engagement content consumer 106 has with respect to content 108 managed by content creator 110. The level of engagement can be determined based on a weighted aggregation of transactions 104 associated with content consumer 106 that relate to content 108 managed by content creator 110. Hence, scoring component 114 can determine engagement score 302 based on a specific set of suitable transactions 104 and engagement data 304. Engagement data 304 can be based on a policy or based on preferences or settings, and can include score weights for various types of transactions 104 (e.g., +10 for a positive comment transaction 204, +100 for a positive subscribe transaction 212, −10 for a negative comment transaction 204 or one determined to be spam, etc.), as well as other suitable information.

Influence score 306 can relate to a determined level of influence associated with content consumer 106. This level of influence can be determined based on a number of subscribers to a content channel (or other broadcast mechanism) associated with content consumer 106. Hence, content consumers 106 with a large following or a large social networking circle or structure can be assigned a higher influence score 306 than content consumer 106 with small followings. Such can be determined by scoring component 114 based on other transactions 308 (e.g., subscribing to the content consumer's channel) and influence data 310 that can relate to the value or weights to apply to other transactions 308.

Candidate score 312 can relate to a determined level of fan value associated with content consumer 106. The level of fan value can be determined based on a function of engagement score 302 and influence score 306. The combination of those two scores can be described by policy, default, or preferences, which can be provided by candidate data 314. As one example, candidate score 312 can be calculated as follows:

Candidate Score=Engagement score*log(Influence score)/log($X$), where $X$ is some base.

In some embodiments, candidate score 312 can be score 116. In other embodiments, score 116 can represent candidate score 312 further refined with addition data or functions, which can be various other combinations with engagement score 302 (or components thereof), influence score 306 (or components thereof), or aggregate data 316, which can be substantially any other suitable data employed to determine score 116.

Continuing the discussion of FIG. 1, system 100 can include fan component 118. Fan component 118 can be configured to determine a set of top fans 120 for content creator 110, where the set of top fans 120 is a subset of the set of content consumers 106. The set of top fans 120 can be determined by fan component 118 based on score 116 associated with respective content consumers 106. In some embodiments, the set of top fans 120 can be scaled based on the size of the audience or popularity of a particular content creator 110. For example, set 120 might include 1,000 top fans when content creator 110 has 100,000 or more subscribers (or another suitable metric), but only include 25 top fans when content creator 110 has only about 1,000 subscribers, or 10 top fans if content creator 110 has fewer than 100 subscribers.

Figure 4:
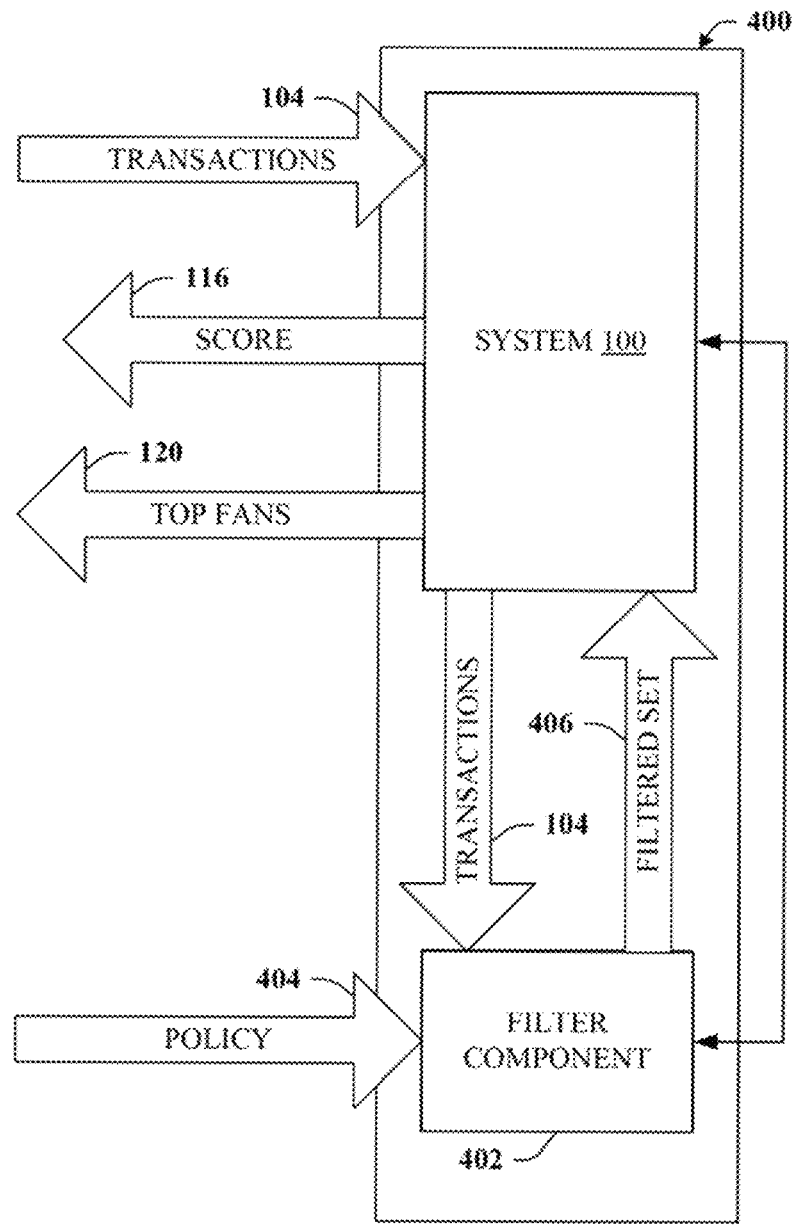
FIG. 4 illustrates a block diagram of an example system that can provide for identifying transactions that are not fan-oriented in accordance with certain embodiments of this disclosure.

With reference now to FIG. 4, system 400 is provided. System 400 provides for identifying transactions 104 that are not fan-oriented. System 400 can include all or portions of system 100 or other system or components detailed herein. For example, system 400 can receive or examine data associated with transactions 104, as detailed in connection with examination component 102 of FIG. 1. However, prior to determining score 116 and/or set of top fans 120, transactions 104 can be filtered or otherwise tagged for other processing.

For example, system 400 can include filter component 402 that can be configured to filter transactions 104 according to a defined policy 404. Filter component 402 can thus provide filtered set of transactions 406 (based on policy 404) to scoring component 114 of FIG. 1. Thus, score 116 and set of top fans 120 can be determined based on filtered set 406 rather than on unfiltered transactions 104. In some embodiments, filter component 402 can provide score adjustment data (detailed with reference to FIG. 5) for transactions 104 that meet certain filter criterion described by policy 404. Hence, rather than filtering some transactions 104, which would equate to assigning no score value to those filtered transactions 104, those transactions 104 (or some portion thereof) can instead be deemed to reflect a score penalty (e.g., a negative score). How filter component 402 treats any given transaction 104 can be based on policy 404, which can be determined by content creator 110, content hosting site or service 112, or another authorized entity or device.

Figure 5:
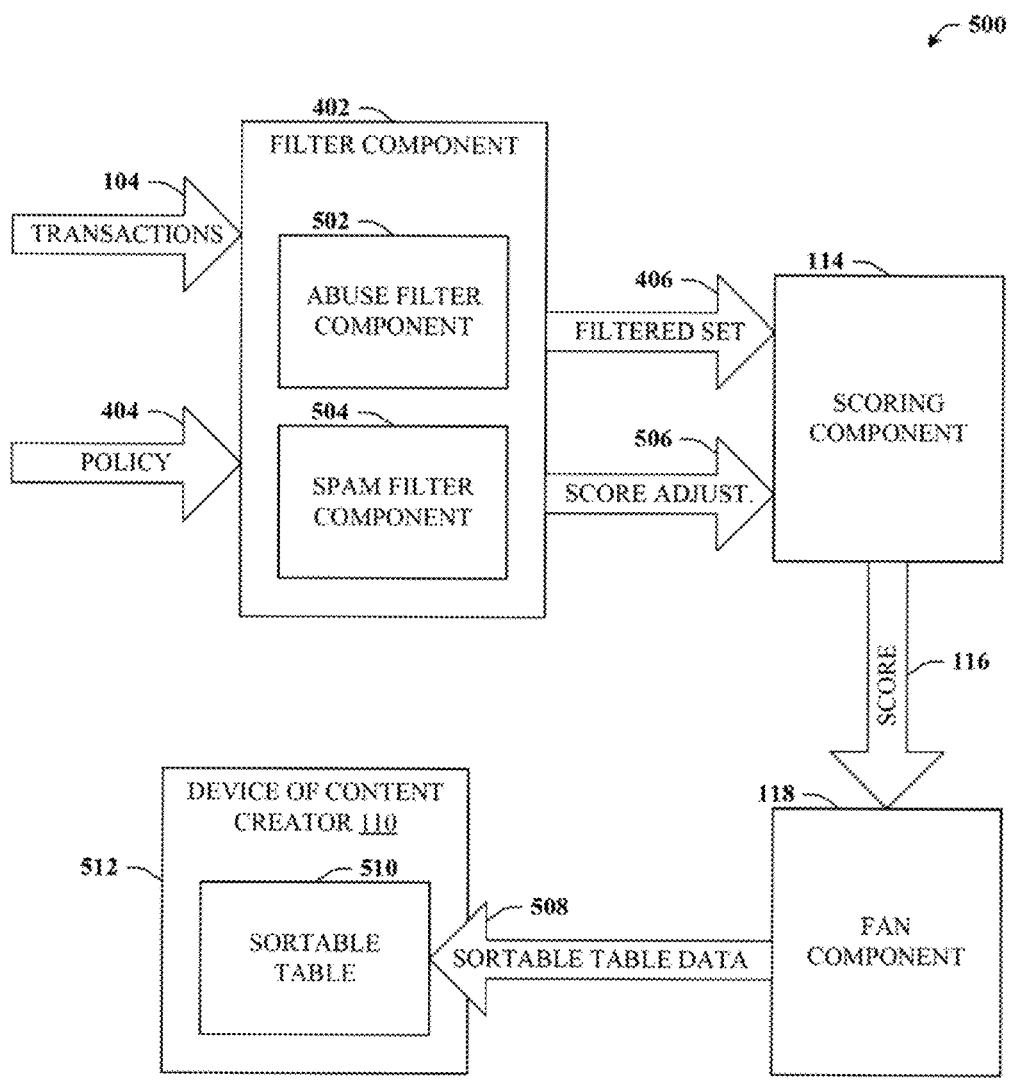
FIG. 5 illustrates a block diagram of an example system that can provide for additional features or aspects associated with filtering and scoring transactions and presenting results in connection with an example user interface in accordance with certain embodiments of this disclosure.

Referring now to FIG. 5, system 500 is illustrated. System 500 can provide for additional features or aspects associated with filtering and scoring transactions and presenting results. System 500 can includes filter component 402 as described herein. Filter component 402 can receive data associated with transactions 104 as well as a policy 404 that can be employed to affect the operation of filter component 402.

For example, filter component 402 can be configured to filter or flag for alternative scoring transactions 104 that are determined to be negative or abusive, which can be accomplished by abuse filter component 502. Abuse filter component 502 can examine sentence structure associated with comments or other input or examine data that often implies abusive or "trolling" behavior such as, e.g., user selection of spam indicators, dislikes, down voting, profile blocks, or the like.

Filter component 402 can be configured to filter or flag for alternative scoring transactions 104 that are determined to be focused on promoting other content, which can be accomplished by spam filter component 504. Spam filter component 504 can examine similar data sets as those detailed above to determine "spamming" behavior.

Transactions 104 so identified by abuse filter component 502 or spam filter component 504 can be filtered prior to scoring (e.g., removed from filtered set 406) or flagged for alternative scoring (e.g., score adjustment 506) such that a comment might penalize a particular content consumer 106 score 116 by −10 points instead of adding +10 points to the score 116. Hence, scoring component 114 can determine score 116 based on the filtered set 406 and/or based on score adjustment 506.

Based on score 116, fan component 118 can determine sortable table date 508, which can include set of top fans 120 as well as other relevant data. Sortable table data 508 can be provided to a sortable table 510 that can be included in and/or presented by device 512 associated with content creator 110. In some embodiments, a presentation of sortable table 510 can include one or more of the following: a fan channel name, a feature to add, delete, or update the fan channel name, a link to the fan channel that facilitates exclusive communication with the set of top fans 120, a count of the set of top fans 120, a table feature that, upon selection, sorts the table by score 116, a table feature that, upon selection, sorts the table by an engagement score 302, a table feature that, upon selection, sorts the table by an influence score 306, a table feature that, upon selection, sorts the table by a candidate score 312, a chart or graph that depicts the score 116, the engagement score 302, the influence score 306, or the candidate score 312 for a portion of the set of top fans 120. A non-limiting example of sortable table 510 is provided in connection with FIG. 7.

Example User Interfaces Associated with Top Fans

Figure 6:
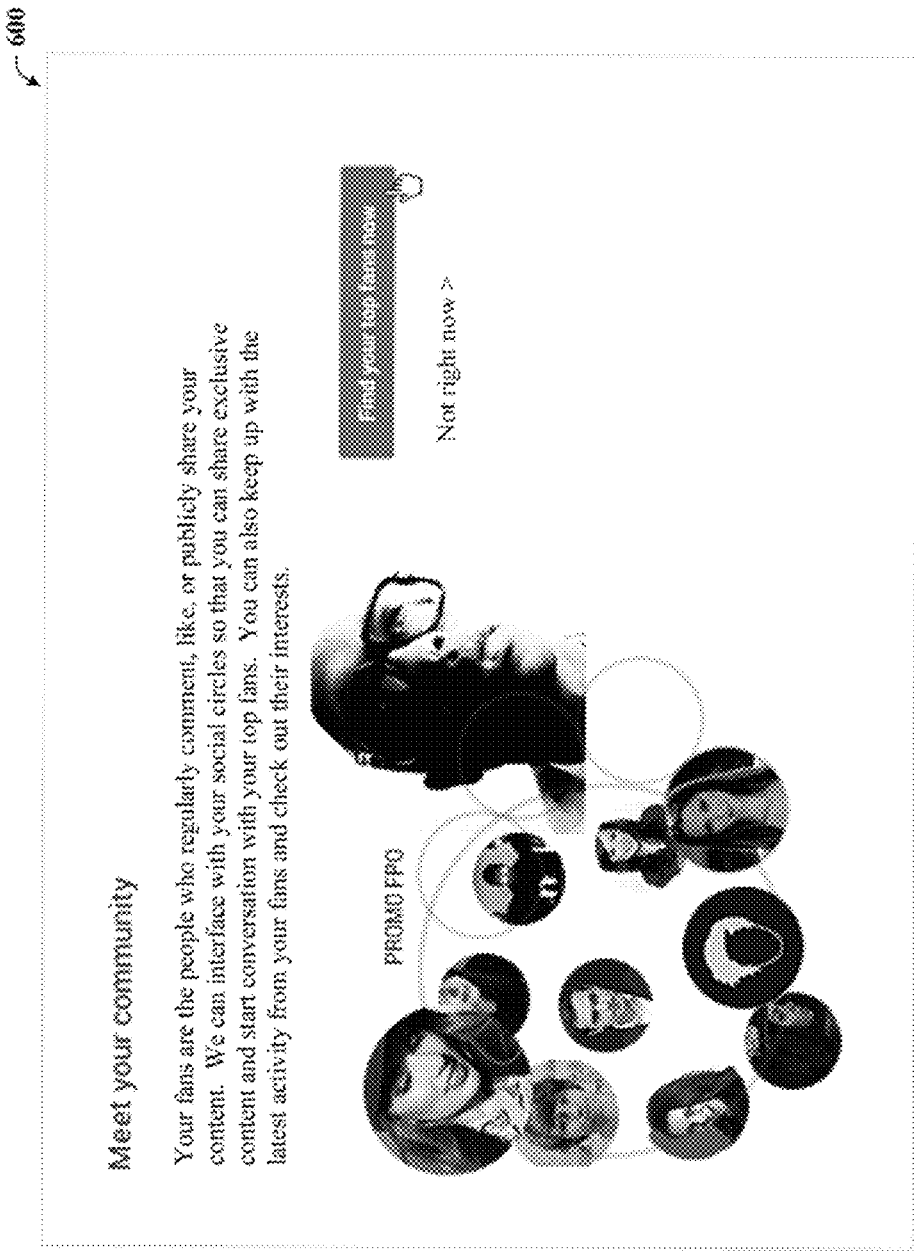
FIG. 6 illustrates a graphical illustration that can provide for an example ser interface that relates to a promotion that invites a content creator to process and/or identify associated top fans in accordance with certain embodiments of this disclosure.

FIG. 6 depicts an example user interface 600. User interface (UI) 600 relates to a promotion that invites a content creator to process and/or identify associated top fans. For example, in connection with uploading content 108 or reviewing data associated with content 108, content creator 110 can be introduced to features or benefits detailed herein. Content creator 110 can provide input indicating whether or not the identification of top fans is of interest.

Figure 7:
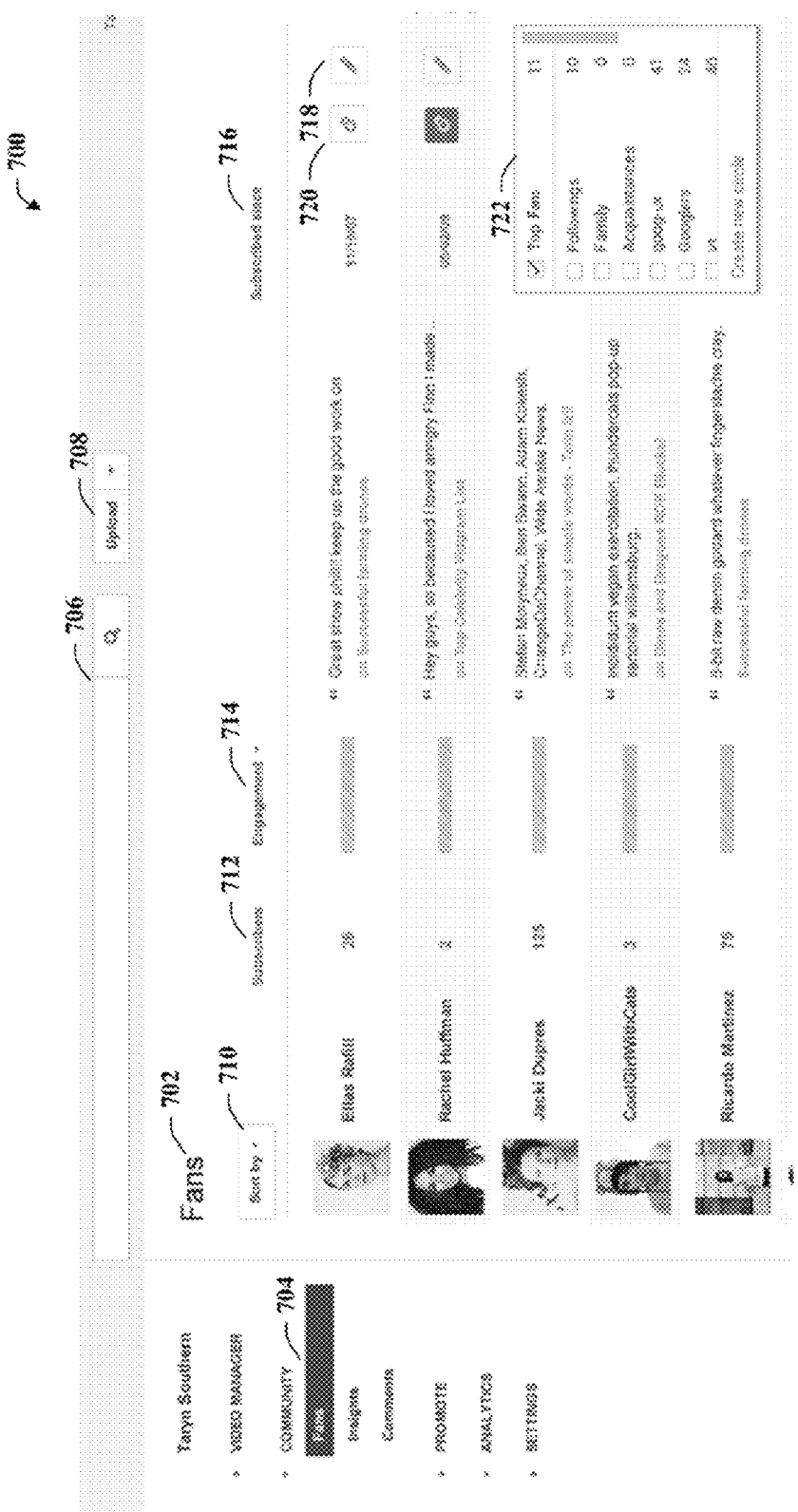
FIG. 7 illustrates a graphical illustration that can provide for an example presentation of a sortable table associated with an example user interface in accordance with certain embodiments of this disclosure.

Turning now to FIG. 7, example user interface 700 is illustrated. User interface 700 can provide for an example presentation of sortable table 510. As noted previously, the presentation of sortable table 510 (e.g., UI 700) can include a fan channel name 702 as well as UI elements to add, delete or update the fan channel name. UI 700 can include a link 704 to the fan channel that can facilitate exclusive communication with the top fans. UI 700 can include a UI feature 706 for searching data associated with the top fans and/or a UI feature 708 for uploading data to one or more of the top fans or a channel or social circle associated with the top fans.

UI 700 can include a UI feature 710 for sorting the top fans. Such sorting can be, e.g., based on engagement score 302 (or components thereof), influence score 306 (or components thereof), candidate score 312 (or components thereof), recent activity, or the like. UI 700 can include data associated with various components of engagement score 302, influence score 306, or candidate score 312 such as a number of subscribers 712 for a top fan, an level of engagement 714, a date or time 716 associated with a top fan's interest in content 106 of content creator 110, and so on.

UI 700 can include a UI feature 718 for communicating with a top fan. UI 700 can also include UI features 720 and 722. UI feature 720 can relate to selecting the top fan for inclusion in a particular social circle (e.g., in addition to being a top fan), and UI feature 722 can relate to managing various social circles. It is understood that UI 700 is to provide a concrete example of a presentation of sortable table 510, but is not intended to be limiting. Many other features can be included in other embodiments.

Example Methods for Identifying Top Fans

Figure 8:
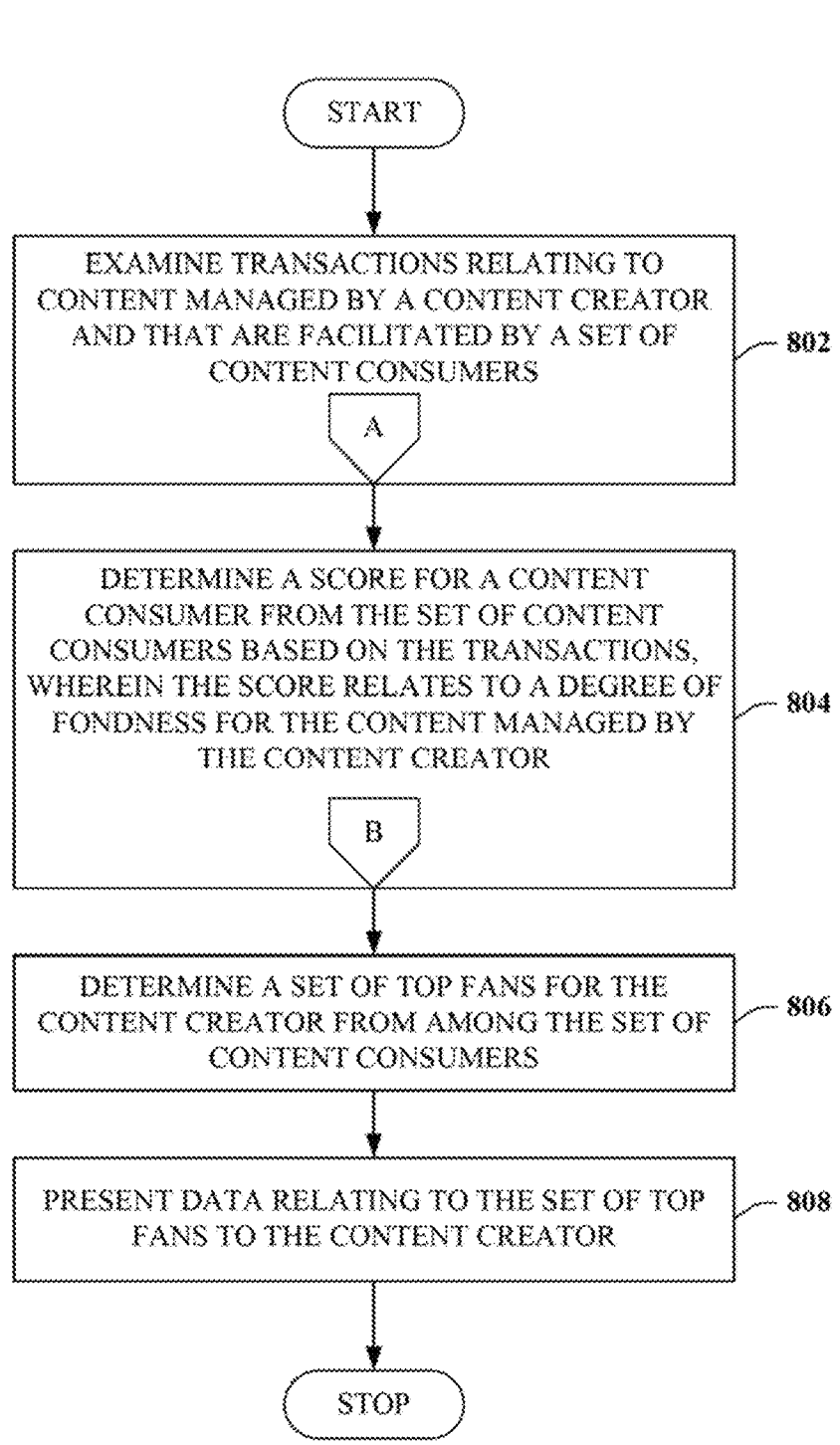
FIG. 8 illustrates an example methodology that can provide for identifying a set of top fans for a content creator in accordance with certain embodiments of this disclosure.
Figure 9:
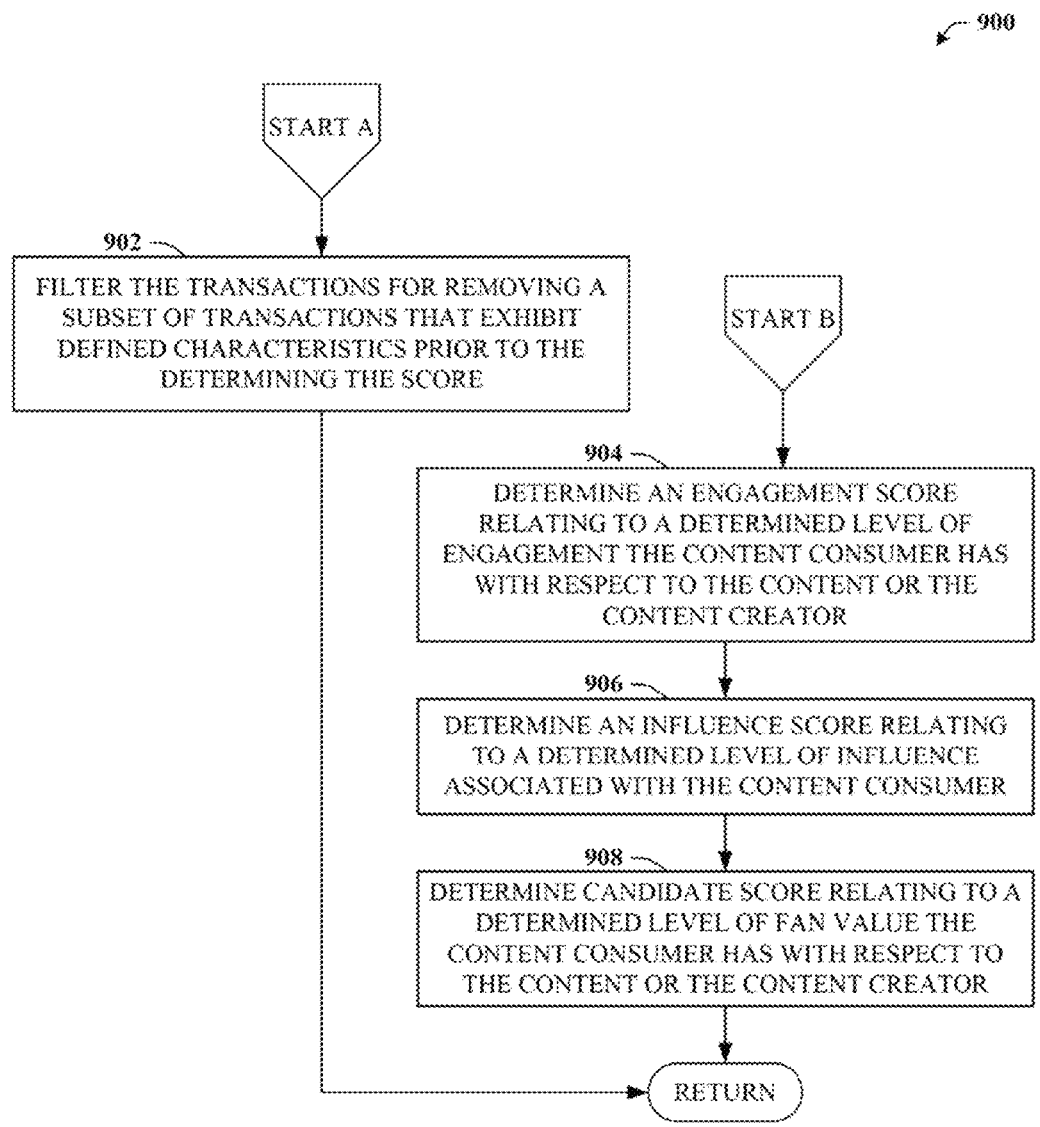
FIG. 9 illustrates an example methodology that can provide for additional features or aspects in connection with identifying a set of top fans in accordance with certain embodiments of this disclosure.

FIGS. 8 and 9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 8 illustrates exemplary method 800. Method 800 can provide for identifying a set of top fans for a content creator. For example, at reference numeral 802, transactions that relate to content managed by a content creator and that are facilitated by a set of content consumers can be examined. In some embodiments, these transactions or associated data for the transactions can be publicly available.

At reference numeral 804, a score for a content consumer from the set of content consumers can be determined based on the transactions. The score can relate to a degree of fondness for the content managed by the content creator. At reference numeral 806, a set of top fans can be determined for the content creator from among the set of content consumers. The set of top fans can be determined based on the score and the number of fans include in the set of top fans can be determined based on size of the content consumer population or another metric associated with the audience of the content creator. At reference numeral 808, data relating to the set of top fans can be presented to the content creator.

Turning now to FIG. 9, exemplary method 900 is depicted. Method 900 can provide for additional features or aspects in connection with identifying a set of top fans. Method 900 can begin at the start of insert A, which relates to examining transactions detailed in connection with reference numeral 802 of FIG. 8. At reference numeral 902, the transactions can be filtered for removing a subset of the transactions that exhibit defined characteristics. Additionally or alternatively, the transactions that exhibit defined characteristics can be tagged for alternative or negative scoring. The filtering or tagging can occur prior to the determining the score discussed in connection with reference numeral 804 of FIG. 8.

Method 900 might also being at the start of insert B, which relates to determining the score detailed at reference numeral 804 of FIG. 8. At reference numeral 904, an engagement score can be determined relating to a determined level of engagement the content consumer has with respect to the content or the content creator. The engagement score can be determined based on publicly available data such as comments input by the content consumer, likes, dislikes, addition to a playlist, subscribing to the content creator, etc.

At reference numeral 906, an influence score can be determined relating to a determined level of influence associated with the content consumer. The level of influence can relate to a size or weight of a following of the content consumer.

At reference numeral 908, a candidate score can be determined relating to a determined level of fan value the content consumer has with respect to the content or the content creator. The candidate score can be a function of the engagement score and the influence score. The score determined at reference numeral 804 can be the candidate score or a function of one or more of the engagement score, the influence score, the candidate score, or other data.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
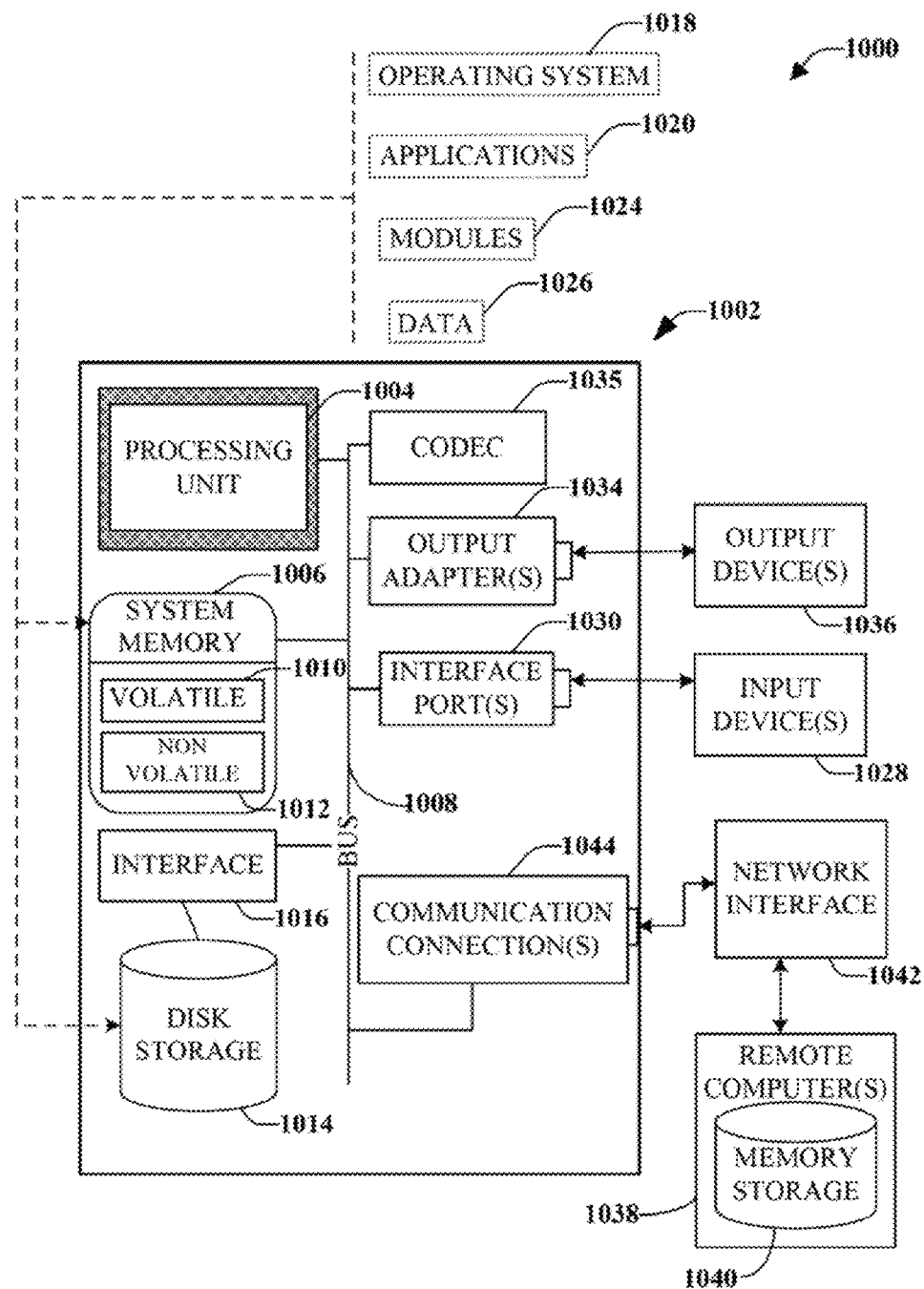
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, software, or a combination of hardware and software. Although, codec 1035 is depicted as a separate component, codec 1035 may be contained within non-volatile memory 1012 or included in other components detailed herein. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 and/or transmitted to the server or application. The user can be provided the opportunity to opt-in or opt-out of having such information collected and/or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
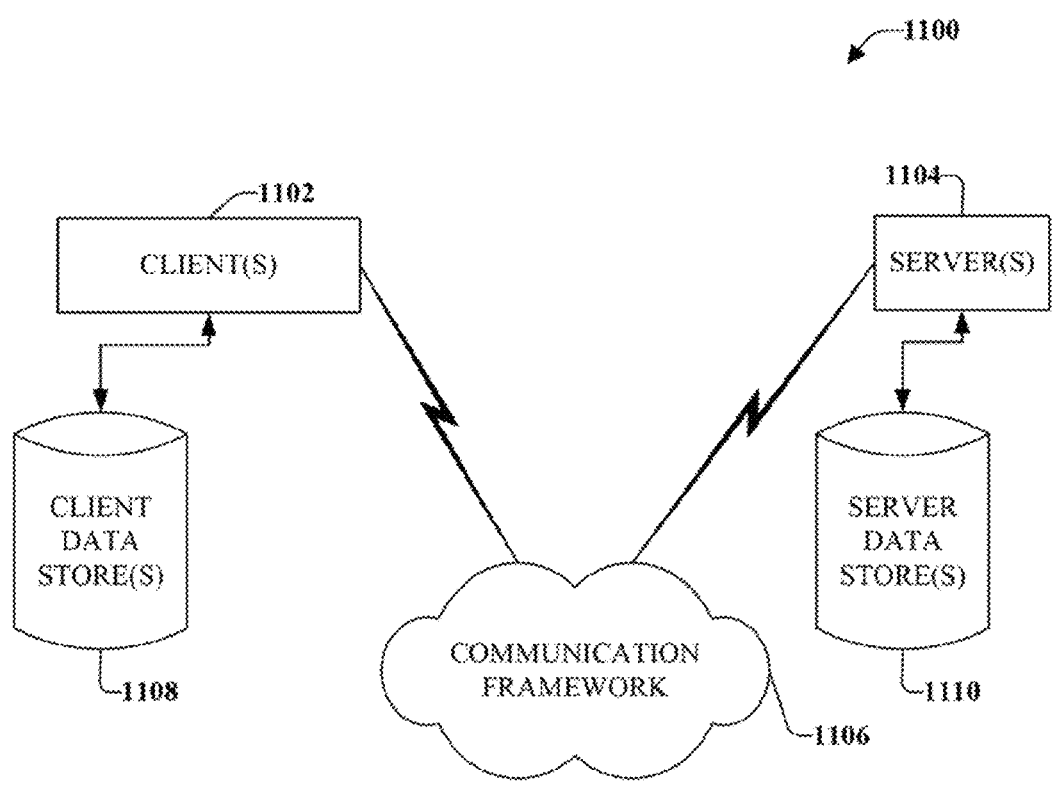
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A method, comprising:
   receiving transactions that relate to media content by a set of content consumers;
   determining, using a hardware processor, a score for a content consumer from the set of content consumers based on a subset of the transactions corresponding to transactions of the content consumer with media content associated with a content creator of a plurality of content creators, wherein the score is based on an engagement score which reflects interaction information with the media content managed by the content creator and an influence score which reflects subscriber information associated with the content consumer;
   modifying the score for the content consumer from the set of content consumers based on negative transactions that have been received from content consumers other than the content consumer and are related to the subset of the transactions corresponding to transactions of the content consumer;
   identifying, using the hardware processor, which content consumers in the set of content consumers are to be deemed top fans for the content creator based on the modified score for the content consumer from the set of content consumers; and
   creating, using the hardware processor, a user interface that allows the content creator to interact with the content consumers that are deemed to be top fans.

2. The method of claim 1, wherein one of the received transactions that relate to the media content by the set of content consumers includes providing a comment associated with the media content.

3. The method of claim 1, wherein one of the received transactions that relate to the media content by the set of content consumers includes providing an indication of interest associated with the media content.

4. The method of claim 1, wherein one of the received transactions that relate to the media content by the set of content consumers includes subscribing to the media content.

5. The method of claim 1, wherein the score for the content consumer is determined by applying a weight to each of the received transactions associated with that content consumer to obtain a weighted aggregation of transactions and wherein the weight is based on a transaction type from a plurality of transaction types.

6. The method of claim 1, further comprising reducing the engagement score over time based on the transactions relating to the media content that are being received.

7. The method of claim 1, further comprising filtering the received transactions by removing a subset of transactions that exhibit defined characteristics prior to determining the score.

8. The method of claim 1, further comprising creating a social network that includes the content consumers that are deemed to be top fans for communicating with the content creator.

9. The method of claim 8, wherein the user interface provides user interface elements for modifying inclusion of the content consumers that are deemed to be top fans in the social network.

10. A system, comprising:
a memory that stores computer-executable instructions; and
a hardware processor that, when executing the computer-executable instructions stored in the memory, is configured to:
receive transactions that relate to media content by a set of content consumers;
determine a score for a content consumer from the set of content consumers based on a subset of the transactions corresponding to transactions of the content consumer with media content associated with a content creator of a plurality of content creators, wherein the score is based on an engagement score which reflects interaction information with the media content managed by the content creator and an influence score which reflects subscriber information associated with the content consumer;
modify the score for the content consumer from the set of content consumers based on negative transactions that have been received from content consumers other than the content consumer and are related to the subset of the transactions corresponding to transactions of the content consumer;
identify which content consumers in the set of content consumers are to be deemed top fans for the content creator based on the modified score for the content consumer from the set of content consumers; and
create a user interface that allows the content creator to interact with the content consumers that are deemed to be top fans.

11. The system of claim 10, wherein one of the received transactions that relate to the media content by the set of content consumers includes providing a comment associated with the media content.

12. The method of claim 10, wherein one of the received transactions that relate to the media content by the set of content consumers includes providing an indication of interest associated with the media content.

13. The method of claim 10, wherein one of the received transactions that relate to the media content by the set of content consumers includes subscribing to the media content.

14. The method of claim 10, wherein the score for the content consumer is determined by applying a weight to each of the received transactions associated with that content consumer to obtain a weighted aggregation of transactions and wherein the weight is based on a transaction type from a plurality of transaction types.

15. The method of claim 10, further comprising reducing the engagement score over time based on the transactions relating to the media content that are being received.

16. The method of claim 10, further comprising filtering the received transactions by removing a subset of transactions that exhibit defined characteristics prior to determining the score.

17. The method of claim 10, further comprising creating a social network that includes the content consumers that are deemed to be top fans for communicating with the content creator.

18. The method of claim 17, wherein the user interface provides user interface elements for modifying inclusion of the content consumers that are deemed to be top fans in the social network.

19. A non-transitory computer-readable medium containing computer executable instructions that, when executed by a processor, cause the processor to perform a method for facilitating communications with content consumers, the method comprising:
receiving transactions that relate to media content by a set of content consumers;
determining a score for a content consumer from the set of content consumers based on a subset of the transactions corresponding to transactions of the content consumer with media content associated with a content creator of a plurality of content creators, wherein the score is based on an engagement score which reflects interaction information with the media content managed by the content creator and an influence score which reflects subscriber information associated with the content consumer;
modifying the score for the content consumer from the set of content consumers based on negative transactions that have been received from content consumers other than the content consumer and are related to the subset of the transactions corresponding to transactions of the content consumer;
identifying which of the content consumers in the set of content consumers are to be deemed top fans for the content creator based on the modified score for the content consumer from the set of content consumers; and
creating a user interface that allows the content creator to interact with the content consumers that are deemed to be top fans.

* * * * *